(12) United States Patent
Peters

(10) Patent No.: US 9,052,076 B2
(45) Date of Patent: Jun. 9, 2015

(54) LAMP

(75) Inventor: Willem Jan Peters, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 756 days.

(21) Appl. No.: 13/147,214

(22) PCT Filed: Feb. 4, 2010

(86) PCT No.: PCT/IB2010/050512
§ 371 (c)(1),
(2), (4) Date: Aug. 30, 2011

(87) PCT Pub. No.: WO2010/092511
PCT Pub. Date: Aug. 19, 2010

(65) Prior Publication Data
US 2011/0304653 A1      Dec. 15, 2011

(30) Foreign Application Priority Data

Feb. 10, 2009   (EP) .................................... 09152423

(51) Int. Cl.
| | | |
|---|---|---|
| *G09G 5/10* | (2006.01) | |
| *F21S 10/00* | (2006.01) | |
| *F21V 23/04* | (2006.01) | |
| *G02F 1/1333* | (2006.01) | |

(52) U.S. Cl.
CPC ............. *F21S 10/00* (2013.01); *F21V 23/0442* (2013.01); *G02F 1/133305* (2013.01)

(58) Field of Classification Search
CPC . G09G 3/3648; G09G 3/3614; G09G 3/3688; G09G 3/3611; G09G 3/2011; G09G 2320/0276; G09G 2360/16; G09G 2320/0626

USPC ........... 345/76–83, 87–89, 690; 315/312, 291
See application file for complete search history.

(56) References Cited

U.S. PATENT DOCUMENTS

| | | |
|---|---|---|
| 4,285,028 A | 8/1981 | Sundin et al. |
| 6,888,779 B2 | 5/2005 | Mollicone |
| 2003/0095447 A1 | 5/2003 | Dean |
| 2003/0231495 A1 | 12/2003 | Searfoss, III |
| 2005/0117458 A1 | 6/2005 | Claessens |
| 2005/0128743 A1 | 6/2005 | Chuey et al. |
| 2005/0152223 A1 | 7/2005 | Kawakami |
| 2007/0086199 A1 | 4/2007 | Demarest |
| 2007/0268234 A1 | 11/2007 | Wakabayashi et al. |

(Continued)

FOREIGN PATENT DOCUMENTS

| | | |
|---|---|---|
| GB | 2422447 A | 7/2006 |
| JP | 4253104 A | 9/1992 |

(Continued)

*Primary Examiner* — Kimnhung Nguyen

(57) ABSTRACT

A lamp (100) comprises:
 at least one light-generating element (2);
 a partially transparent shade (5) arranged to surround the light-generating element (2) over an angle of at least 180° but preferably 360°;
 at least one LCD screen (10) arranged between the light generating element and the shade;
 a controller (20) for controlling the LCD screen such as to display an image.
In horizontal cross-section, the LCD screen extends in two dimensions, with a concave side towards the light generating element.
The LCD screen preferably is flexible, and may be bent to a cylindrical shape around the light-generating element.

21 Claims, 4 Drawing Sheets

(56) References Cited

U.S. PATENT DOCUMENTS

2008/0273319 A1 11/2008 VanderSchuit
2009/0066633 A1* 3/2009 Iwasaki .................. 345/102
2009/0267892 A1* 10/2009 Faubert .................. 345/156

FOREIGN PATENT DOCUMENTS

| WO | 2009030882 A2 | 3/2009 |
| WO | 2009090596 A1 | 7/2009 |
| WO | 2009101557 A1 | 8/2009 |

* cited by examiner

LAMP

FIELD OF THE INVENTION

The present invention relates in general to lamps.

BACKGROUND OF THE INVENTION

FIG. 1 schematically shows a lamp 1, comprising one or more actual light-generating elements 2, mounted on a base 3. A voltage source or current source for the light-generating element(s) 2 may be arranged in the base 3, and may comprise a battery (not shown) as a power source or a power cord with connector 4 for connection to the electric mains. The light-generating element(s) 2 may be implemented as an incandescent light bulb, or a gas discharge element such as for instance TL or PL, or an LED.

The lamp 1 further comprises a cap or shade 5. The shade 5 serves, on the one hand, to protect the light generating element 2 and, on the other hand, it serves an ornamental purpose. The shade 5 is typically diffusely transparent, so that the light generating element 2 is hidden from direct view, whereas, when the light generating element 2 is ON, it illuminates the shade 5. The shape of the shade 5 will vary, depending on the shape of the lamp 1. In the embodiment illustrated schematically, the shade 5 has the shape of a part of a cone, but the shade 5 may alternatively for instance have a ball shape, a cylindrical shape, a box shape, or any other shape enclosing the light generating element 2. The lamp has an intrinsic orientation for being mounted on a wall or, as in the illustration, placed on a surface, in which case the lamp has an upper side and a lower side; the directions "vertical" and "horizontal" will be used in relation to this orientation. In a free-standing embodiment, the shade 5 will surround the light generating element 2 over 360° in the horizontal direction, but in a wall-mounted embodiment, the shade 5 will surround the light generating element 2 over 180° in the horizontal direction.

SUMMARY OF THE INVENTION

Conventionally, a user could only switch a lamp ON or OFF. Nowadays, a user has more control over the light generated by the lamp, which includes the possibility to vary the light intensity between normal (100%) and practically zero, and the possibility to vary the color, especially in the case of a LED lamp.

An object of the present invention is to provide a lamp offering increased possibilities for a user to adapt the lamp to his lighting needs.

According to the present invention, a lamp of the type as discussed above is provided with an LCD screen arranged between the light generating element(s) and the shade, and a controller for controlling the LCD screen such as to display an image. As a result, the displayed image will be projected on the shade, so that this image will be part of the outer appearance of the lamp.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, in which indications "below/above", "higher/lower", "left/right" etc only relate to the orientation displayed in the drawings, and in which.

DETAILED DESCRIPTION OF THE INVENTION

Figure 1:
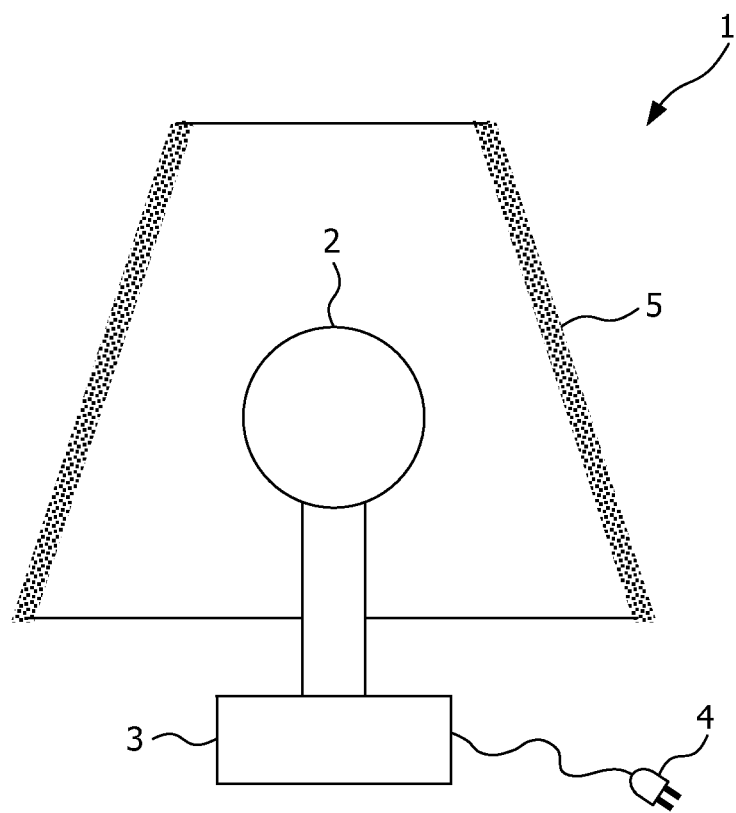
FIG. 1 schematically shows a conventional lamp.
Figure 2:
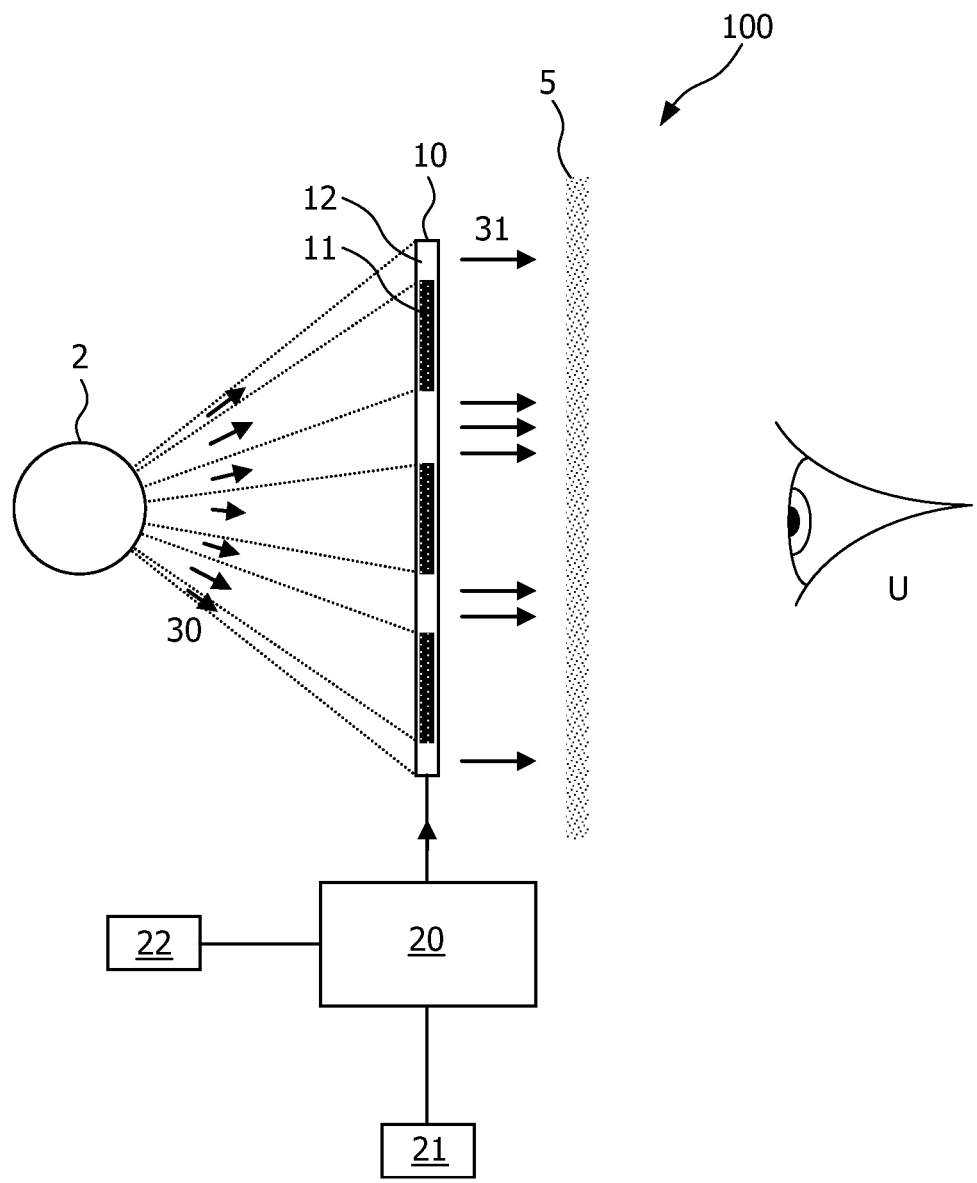
FIG. 2 is a diagram schematically illustrating the present invention.

FIG. 2 is a functional diagram schematically illustrating the operating principle of a lamp 100 according to the present invention. An LCD screen 10 is arranged between the light generating element(s) 2 and the shade 5, and a controller 20 is provided for controlling the LCD screen 10 such as to display a certain image. Since LCD screens are known per se, a more detailed explanation is omitted here. Further, since controllers for LCD screens are known per se, a more detailed explanation is omitted here. In operation, the LCD screen 10 displaying an image will have portions 11 exhibiting low transmission, which portions will simply be indicated as "dark", and portions 12 exhibiting high transmission, which portions will simply be indicated as "bright". In practice, the LCD screen 10 may of course have portions with the transmission varying between 0% and 100%. The light generating element(s) 2 will generate light 30, that will pass (31) the LCD screen 10 in accordance with the local transmissivity of the LCD screen 10. The light 31 passing the LCD screen 10 will reach the shade 5, and project a projection of the LCD screen 10 onto the shade 5. The shade 5 is semi-transparent, with diffusing properties. For instance, the shade may be implemented as glass or plastic of the well-known "milky" type, or the shade may be implemented in textile, thinly sliced wood, etc. In any case, a user U cannot actually "see" through the shade 5: he only sees the shade illuminated, which seems to emit light. As a result, the image projected on the shade will be part of the outer appearance of the lamp. The user, looking at the lamp 100, will perceive the lamp 100 as having a shade 5 with a projected image corresponding to the image displayed by the LCD screen 10.

The controller 20 may be provided with a user interface 21, so that the user may select an image from a database of images stored in a memory 22 associated with the controller 20. Controller 20 and memory 22 may suitably be accommodated in the base 3. It is possible that the user interface includes a keyboard. It is also possible that the user interface includes a communication port, for instance USB, so that the user is able to upload one or more images into the memory 22. It is further possible that the user interface includes a wireless communication facility, for instance Bluetooth. It is further possible that the controller 20 has internet connectivity.

The preferred location for the LCD screen 10 is close to the shade 5, perhaps even in contact with the shade 5. The LCD screen 10 and shade 5 may be integrated. However, a location closer to the light generating element(s) 2 is within the scope of the present invention.

Figure 3A:
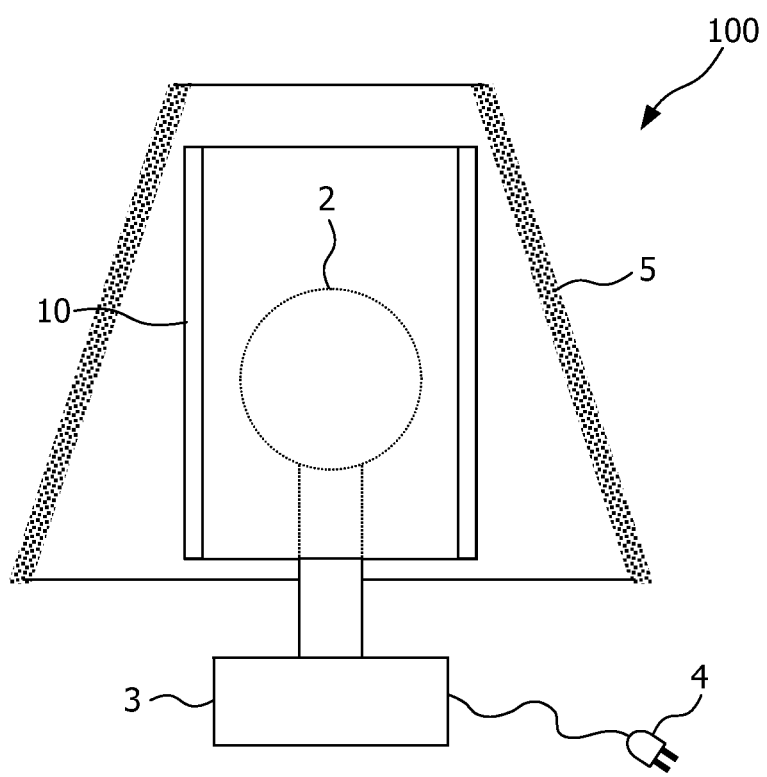
FIG. 3A is a view comparable to FIG. 1, schematically illustrating an embodiment of a lamp according to the present invention.
Figure 3B:
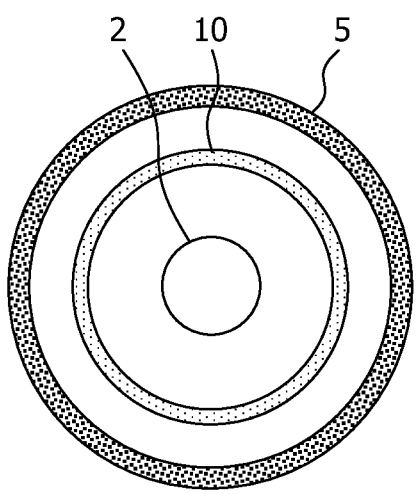
FIGS. 3B and 3C are schematic top views of the lamp of FIG. 3A.
Figure 3C:
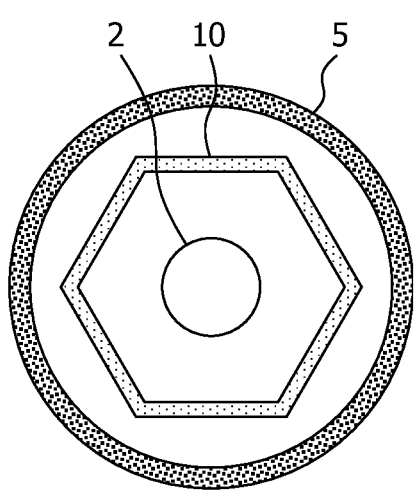

The shape of the LCD screen 10 may be chosen in accordance with the actual shape of the shade 5. In the embodiment schematically illustrated in FIG. 3, in which the light generating element 2 is shown in dotted lines, it is assumed that, in a top view, the shade 5 surrounds the light generating element 2 over 360°, while the LCD screen 10 also surrounds the light generating element 2 over 360°. The LCD screen 10 may be constituted by joining a series of flat panels, as illustrated in FIG. 3C. However, in a preferred embodiment, the LCD screen 10 is implemented as a flexible screen, which in general is folded in a curved shape to adapt to a curved outer ornamental screen, particularly, as schematically illustrated in FIG. 3B, bent to a cylindrical shape and placed around the light generating element(s) 2.

If the shade 5 extends only over about 180°, the LCD screen 10 is suitably adapted to extend over 180° also. However, it is possible that the shade 5 extends over 360° but that the device has a front side and a back side, and that the device is intended for placement with its back side towards a wall so that the functionality provided by the present invention is only needed at the front side: in that case, the LCD screen 10 needs only to extend over about 180°. In any case, in horizontal cross section, the LCD screen 10 does not extend in one direction only, but it extends in two dimensions, with a concave side towards the light generating element 2.

Figure 4A:
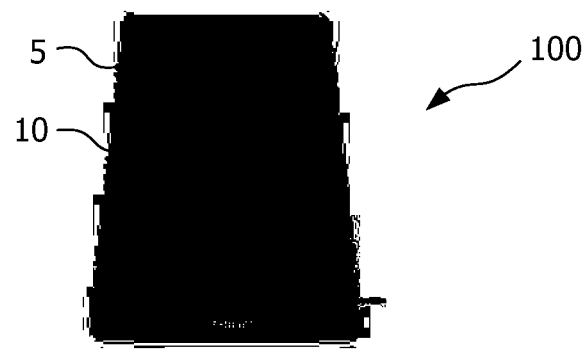
FIGS. 4A-4C are side views of several embodiments of a lamp according to the present invention.
Figure 4B:
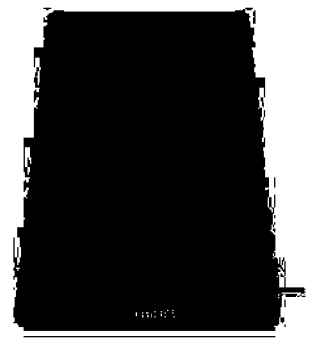
Figure 4C:
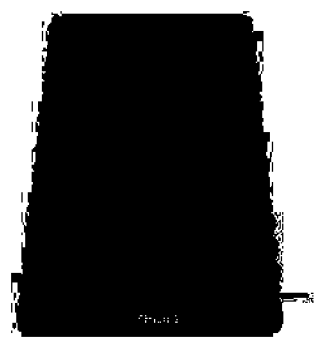

FIGS. 4A-4C are side views of the lamp 100, illustrating several possibilities for applying the present invention. In these Figures, the base 3 is not shown. FIG. 4A illustrates that the image displayed on the LCD screen 10 (and hence projected on the shade 5) may be chosen in accordance with a certain outside weather condition or season, for instance autumn leaves. FIG. 4B illustrates that the image displayed on the LCD screen 10 may include animals, such as birds. FIG. 4C illustrates that the image displayed on the LCD screen 10 may include functional information, such as a clock time, either in the shape of digits or, as shown, as an analogue clock with hands.

The images displayed on the LCD screen 10 (and hence projected on the shade 5) may be still images, but they may also be moving images or a succession of still images. For instance, the leaves of FIG. 4A may be shown as slowly moving downwards; the birds of FIG. 4B may be shown as flying; the clock of FIG. 4C may be controlled to show the actual time. Furthermore, especially in the case of a cylindrical LCD screen 10, the location of the image on the screen (whether a still image or a moving image) may be stationary but may also be slowly displaced over the surface of the LCD screen 10: for instance, the display may slowly perform rotations through 360° around the light generating element(s) 2.

In a further elaboration, the lamp may be combined with audio functions. For instance, the lamp may be provided with a sound sensor (for instance a microphone) coupled to the controller while the controller is provided with sound processing and analyzing software: if the controller finds that the sound as received actually corresponds to one of a plurality of predefined topics (for instance: bird sounds, barking of (a) dog(s), automobile racing), the controller may automatically select from the memory 22 an image corresponding to the sound (bird image (see FIG. 4B), dog image, car image). In another example, the lamp may be provided with a radio receiver and loudspeaker while the controller is provided with sound processing and analyzing software: if the controller finds that the sound as received on the radio receiver and produced through the speaker corresponds to one of a plurality of predefined topics (for instance: bird sounds, barking of (a) dog(s), automobile racing), the controller may automatically select from the memory 22 an image corresponding to the sound (bird image (see FIG. 4B), dog image, car image).

In a preferred embodiment, the lamp is a wake-up lamp, i.e. a lamp which gradually increases its light intensity from almost zero to almost 100% to simulate the sunrise. Since such wake-up lamps are known per se and are commercially available, a more detailed explanation is omitted here.

Summarizing, the present invention provides a lamp 100 comprising at least one light-generating element 2; a partially transparent shade 5 arranged to surround the light-generating element 2 over an angle of at least 180° but preferably 360°; at least one LCD screen 10 arranged between the light generating element and the shade; and a controller 20 for controlling the LCD screen such as to display an image. In horizontal cross-section, the LCD screen extends in two dimensions, with a concave side towards the light generating element. The LCD screen preferably is flexible, and may be bent to a cylindrical shape around the light-generating element.

In this respect, it is noted that the lamp will have a top and a bottom, which, in the mounted condition, will be aligned with a vertical direction, and that the direction "horizontal" is taken to be perpendicular to this vertical direction.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appended claims. For instance, the lamp may comprise several LCD screens.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

In the above, the present invention has been explained with reference to block diagrams, which illustrate functional blocks of the device according to the present invention. It is to be understood that one or more of these functional blocks may be implemented in hardware, where the function of such (a) functional block(s) is performed by individual hardware components, but it is also possible that one or more of these functional blocks are implemented in software, so that the function of such (a) functional block(s) is performed by one or more program lines of a computer program or a programmable device such as a microprocessor, microcontroller, digital signal processor, etc.

The invention claimed is:

1. Lamp, comprising:
   at least one light-generating element;
   a partially transparent shade arranged to surround the light-generating element over an angle of at least 180°;
   at least one LCD screen arranged between the light generating element and the shade, the at least one LCD screen having at least one portion exhibiting low transmission and at least one portion exhibiting high transmission; and
   a controller for controlling the LCD screen such as to display an image, said image having at least one discernable object.

2. Lamp according to claim 1, wherein, in horizontal cross-section, the LCD screen extends in two dimensions, with a concave side towards the light generating element.

3. Lamp according to claim 1, wherein the shade is semi-transparent, with diffusing properties.

4. Lamp according to claim 3, wherein the controller is provided with a user interface allowing a user to select an image from the memory.

5. Lamp according to claim 4, wherein the user interface includes a communication port allowing a user to store images in the memory.

6. Lamp according to claim 1, wherein the LCD screen is a flexible screen.

7. Lamp according to claim 1, wherein the LCD screen is bent to a cylindrical shape and is arranged around the light generating element.

8. Lamp according to claim 1, wherein the LCD screen is constituted from at least two planar panels that are arranged at an angle larger than zero with respect to each other.

9. Lamp according to claim 1, wherein the lamp is provided with a sound sensor coupled to the controller, wherein the controller is provided with sound processing and analyzing software.

10. Lamp according to claim 1, wherein the lamp is provided with a radio receiver and a loudspeaker, wherein the controller is provided with sound processing and analyzing software.

11. Lamp according to claim 1, wherein the shade is arranged to surround the light-generating element over an angle of 360°.

12. Lamp according to claim 1, wherein the lamp is a wake-up lamp.

13. Lamp according to claim 1, wherein the image is a clock depicting a time.

14. Lamp according to claim 1, wherein the image is a moving image.

15. Lamp according to claim 1, wherein the image depicts a weather condition corresponding to a weather condition of a specific location.

16. Lamp according to claim 1, wherein the image is a succession of still images.

17. Lamp according to claim 1, further comprising a memory storing therein a collection of images, wherein the controller includes software for selecting the image from the memory based on one of the nature of a sensed sound and the nature of a received audio.

18. Lamp, comprising:
at least one light-generating element;
a partially transparent shade arranged to surround the light-generating element over an angle of at least 180°;
at least one LCD screen arranged between the light generating element and the shade, and configured to move with respect to the at least one light-generating element; and
a controller for controlling the LCD screen by changing the intensity of the lamp over a period of time to simulate a sunrise.

19. Lamp according to claim 18, wherein, in horizontal cross-section, the LCD screen extends in two dimensions, with a concave side towards the light generating element.

20. Lamp according to claim 18, wherein the shade is semi-transparent, with diffusing properties.

21. Lamp according to claim 18, further comprising a memory storing therein a collection of images, wherein the controller includes software for selecting the image from the memory based on one of the nature of a sensed sound and the nature of a received audio.

* * * * *